May 13, 1952     C. T. CROWLEY     2,596,763
SALT CELLAR HAVING ABSORBENT CARTRIDGE
Filed May 23, 1946
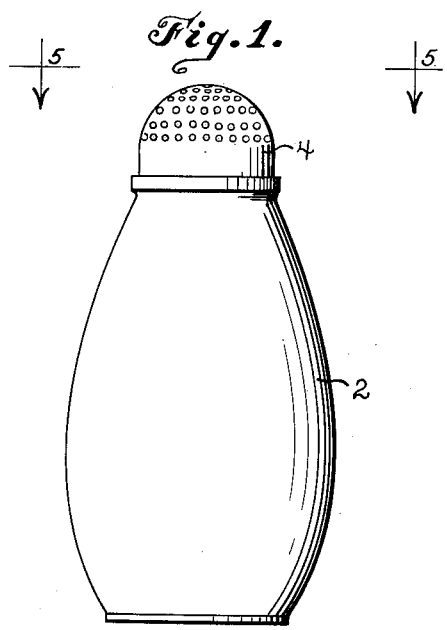
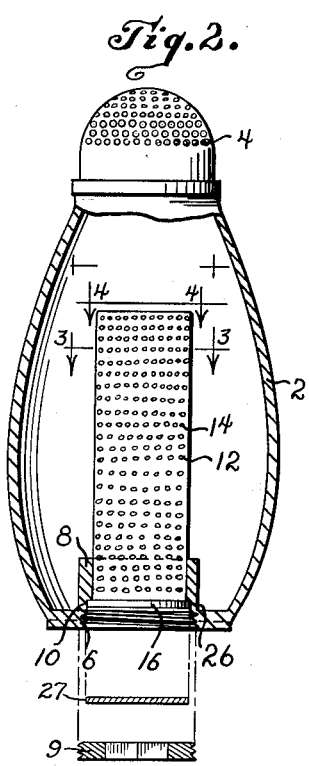
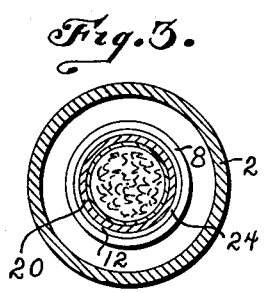
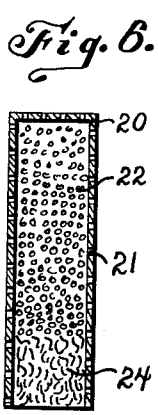
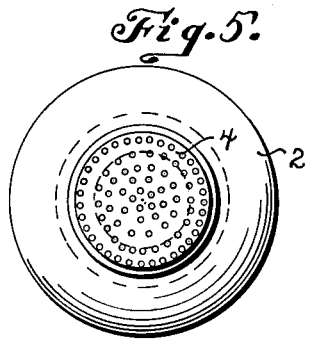
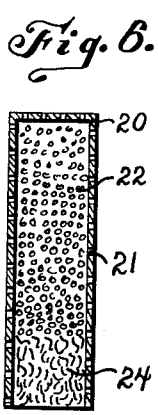
*INVENTOR.*
Charles T. Crowley
BY *Victor J. Evans & Co.*
ATTORNEYS

UNITED STATES PATENT OFFICE 2,596,763

SALT CELLAR HAVING ABSORBENT CARTRIDGE

Charles T. Crowley, Baltimore, Md.

Application May 23, 1946, Serial No. 671,746

1 Claim. (Cl. 222—23)

My present invention relates to an improved salt cellar having absorbent cartridge of the type useable under various circumstances to collect and remove moisture from containers of different sorts. The cartridge is especially useful when employed in salt cellars as herein associated but it will be understood that the use of the cartridge is not limited to such use but may well be employed for absorbent purposes under varying conditions.

Broadly my invention consists in the placement in the exemplifying structure, a salt cellar, a container of calcium chloride and absorbent paper in order that the moisture within the salt cellar will be absorbed by the calcium chloride and the deliquifying properties of the calcium chloride will condense the moisture and pass it in liquid form to the absorbent paper. When the paper has become saturated with water, the paper may be replaced with fresh paper, and when the calcium chloride has become dissolved and its absorbent qualities depleted, the cartridge may be replaced.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 1 is a side elevational view of a conventional salt cellar.

Figure 2 is a vertical sectional view of the salt cellar showing my invention, the container therein is in exploded form to show the litmus paper and plug.

Figure 3 is a horizontal sectional view taken at line 3—3 of Figure 2.

Figure 4 is a vertical sectional view of the container.

Figure 5 is a top plan view of the salt cellar.

Figure 6 is a vertical sectional view of the paper bag insert for the container.

Referring now to the drawings in detail, I have shown a conventional salt cellar 2 having a perforated cap 4. The cellar may be of any suitable material as glass, plastic or metal. The cellar is fashioned with a lower threaded opening 6, and an interior ring 8, formed with an annular groove 10.

In carrying out my invention I utilize a cylinder 12 perforated as at 14 of any suitable material and the lower open end of the cylinder is fashioned with an exterior annular rim 16, interiorly threaded as at 18 and adapted for insertion in the hole 6 of the cellar, the rim 16 fitting into the groove 10 of the annular ring 8.

Interior of the cylinder 12 I employ a paper bag 20 perforated as at 21 and this bag contains granules 22 of calcium chloride, and a sufficient amount of absorbent paper 24 to fill the bag. A plug 9 is then threaded into the opening 6 to retain the cylinder within the cellar.

The salt in the salt cellar surrounds the cylinder and the moisture in the cellar and in the salt will be absorbed by the calcium chloride through the perforation of the cylinder and the paper bag. The calcium chloride being of a deliquifying agent will condense the moisture into water and the absorbent paper 24 will absorb the water.

If the salt cellar is made of transparent material and the proper amount of calcium chloride is used in the cylinder in conjunction with the proper amount of absorbent paper a spot of moisture below the paper would clearly indicate that the paper is saturated and should be removed.

However, if the cellar is made of opaque material then I employ a transparent plug and place a strip of blue litmus paper 27 between the threaded plug for the salt cellar and the cylinder, and the moisture collecting at the base of the cylinder will turn the blue litmus paper red, which being visible through the transparent plug will signal the excess moisture and the need for a change in absorbent paper.

Having thus fully described my invention what I claim as new and desire to secure by Letters Patent is:

In a salt dispenser having a lower threaded opening and an annular ring provided with an inner groove, the combination with a perforated cylinder positioned within said dispenser, an annular rim secured to said cylinder and coacting with said groove, a transparent plug threadably received in said lower threaded opening of moisture-collecting and absorbing means in said cylinder, and means embodying litmus paper positioned between said plug and the rim of said cylinder for visually indicating through said transparent plug the degree of saturation of said absorbing means, said moisture-collecting and absorbing means comprising a perforated bag positioned within said cylinder, calcium chloride granules disposed in said bag, and absorbent paper in said bag for absorbing the liquid from said calcium chloride.

CHARLES T. CROWLEY.

(References on following page)

REFERENCES CITED

The following references are of record in the file of this patent:

UNITED STATES PATENTS

| Number | Name | Date |
|---|---|---|
| 822,638 | Vester | June 5, 1906 |
| 1,048,873 | Puetz | Dec. 31, 1912 |
| 1,134,232 | Ross | Apr. 6, 1915 |
| 1,637,656 | Radcliffe | Aug. 2, 1927 |
| 1,942,900 | Peters | Jan. 9, 1934 |
| 1,947,600 | Isenhower | Feb. 20, 1934 |
| 2,046,132 | Purdy | June 30, 1936 |
| 2,086,073 | Francescon | July 6, 1937 |
| 2,173,046 | Smith | Sept. 12, 1939 |
| 2,249,867 | Snelling | July 22, 1941 |
| 2,317,882 | Boesel | Apr. 27, 1943 |
| 2,357,253 | Coca | Aug. 29, 1944 |
| 2,446,361 | Clibbon | Aug. 3, 1948 |
| 2,492,830 | Bannister | Dec. 27, 1949 |

FOREIGN PATENTS

| Number | Country | Date |
|---|---|---|
| 15,864 | Great Britain | July 6, 1912 |